US012682228B2

(12) United States Patent
Hou

(10) Patent No.: US 12,682,228 B2
(45) Date of Patent: Jul. 14, 2026

(54) SEMICONDUCTOR PROCESS PREDICTION METHOD AND SEMICONDUCTOR PROCESS PREDICTION APPARATUS CONSIDERING OVERALL FEATURES AND LOCAL FEATURES

(71) Applicant: UNITED MICROELECTRONICS CORP., Hsinchu (TW)

(72) Inventor: Hsin-Ming Hou, Tainan City (TW)

(73) Assignee: UNITED MICROELECTRONICS CORP., Hsinchu (TW)

( * ) Notice: Subject to any disclaimer, the term of this patent is extended or adjusted under 35 U.S.C. 154(b) by 1002 days.

(21) Appl. No.: 17/213,760

(22) Filed: Mar. 26, 2021

(65) Prior Publication Data

US 2022/0237450 A1     Jul. 28, 2022

(30) Foreign Application Priority Data

Jan. 28, 2021    (CN) .......................... 202110118090.4

(51) Int. Cl.
*G06N 3/08* (2023.01)
*G06F 16/23* (2019.01)
*G06N 3/045* (2023.01)

(52) U.S. Cl.
CPC ........... *G06N 3/08* (2013.01); *G06F 16/2379* (2019.01); *G06N 3/045* (2023.01)

(58) Field of Classification Search
CPC ........ G06N 3/0895; G06N 3/09; G06N 3/091; G06N 3/092; G06N 3/094; G06N 3/096;

(Continued)

(56) References Cited

U.S. PATENT DOCUMENTS

| | | | | |
|---|---|---|---|---|
| 10,058,290 B1 * | 8/2018 | Proud | ..................... | A61B 5/749 |
| 11,037,060 B2 * | 6/2021 | Nguyen | .................. | G06N 3/08 |

(Continued)

FOREIGN PATENT DOCUMENTS

| | | |
|---|---|---|
| CN | 108268689 A | 7/2018 |
| CN | 108334652 A | 7/2018 |

(Continued)

OTHER PUBLICATIONS

S. Joe Qin et al., "Bridging systems theory and data science: A unifying review of dynamic latent variable analytics and process monitoring", Annual Reviews in Control, vol. 50, pp. 29-48, ISSN 1367-5788, https://doi.org/10.1016/j.arcontrol.2020.09.004, (Year: 2020).*

(Continued)

*Primary Examiner* — David Yi
*Assistant Examiner* — Nicholas Shine
(74) *Attorney, Agent, or Firm* — WPAT, PC

(57) ABSTRACT

A semiconductor process prediction method and a semiconductor process prediction apparatus considering overall features and local features are provided. The semiconductor manufacturing process prediction method includes the following steps. Several equipment sensing curves are obtained. The equipment sensing curves are filtered to reduce the co-linearity of the equipment sensing curves. A Dynamic Time Warping (DTW) procedure is performed to align the equipment sensing curves. The equipment sensing curves which are aligned are inputted into a Convolutional Neural Network (CNN) model to obtain a first prediction result considering the local features. A statistical analysis procedure is performed on the equipment sensing curves to obtain several statistical data. The statistical data are inputted into an Artificial Neural Network (ANN) model to obtain a second prediction result considering the overall features.

(Continued)

According to the first prediction result and the second prediction result, a total prediction result is obtained.

16 Claims, 6 Drawing Sheets

(58) Field of Classification Search
CPC .... G06N 3/098; G06N 3/0985; G06N 3/0455; G06Q 30/0202
See application file for complete search history.

(56) References Cited

U.S. PATENT DOCUMENTS

| | | | |
|---|---|---|---|
| 2002/0173936 A1 | 11/2002 | Srinivasan et al. | |
| 2017/0161412 A1 | 6/2017 | Mi | |
| 2020/0034693 A1* | 1/2020 | Huh | H01L 22/20 |
| 2020/0152179 A1* | 5/2020 | Van Hout | G10L 15/22 |
| 2022/0187847 A1* | 6/2022 | Cella | G06Q 50/40 |
| 2022/0188343 A1* | 6/2022 | Uysal | G06F 16/2474 |

FOREIGN PATENT DOCUMENTS

| | | | | |
|---|---|---|---|---|
| CN | 110646787 A | * | 1/2020 | G01S 13/50 |
| KR | 20110075332 A | | 7/2011 | |
| KR | 20190114694 A | * | 10/2019 | |

OTHER PUBLICATIONS

Oh Kyu Sam et al., "Method for learning and analyzing time series data by using artificial intelligence", English Translation of KR 20190114694 A, Translated by PE2E (Year: 2023).*

Cao et al., "Self-motion estimation method and device and model training method and device", English Translation of CN 110646787 A, Translated by PE2E (Year: 2026).*

* cited by examiner

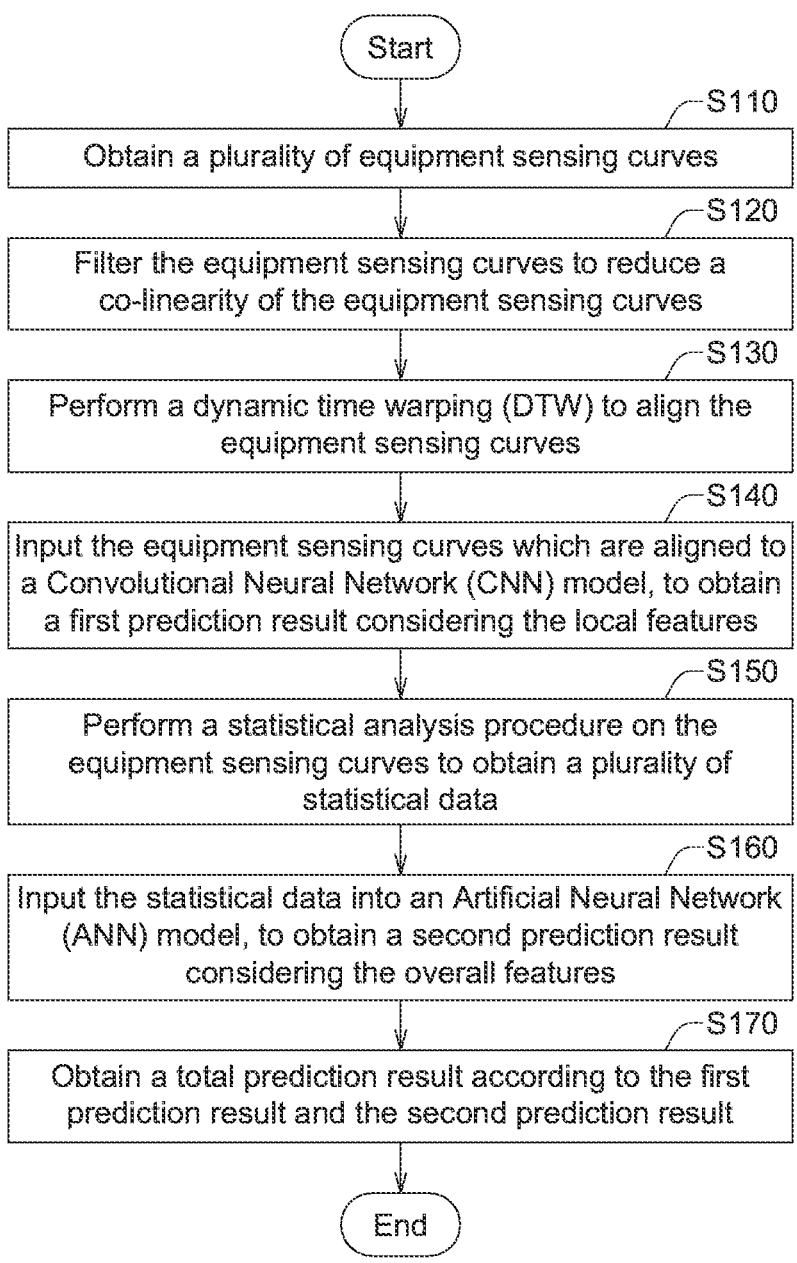

Start

S110
Obtain a plurality of equipment sensing curves

S120
Filter the equipment sensing curves to reduce a co-linearity of the equipment sensing curves S130
Perform a dynamic time warping (DTW) to align the equipment sensing curves S140
Input the equipment sensing curves which are aligned to a Convolutional Neural Network (CNN) model, to obtain a first prediction result considering the local features S150
Perform a statistical analysis procedure on the equipment sensing curves to obtain a plurality of statistical data S160
Input the statistical data into an Artificial Neural Network (ANN) model, to obtain a second prediction result considering the overall features S170
Obtain a total prediction result according to the first prediction result and the second prediction result End

SEMICONDUCTOR PROCESS PREDICTION METHOD AND SEMICONDUCTOR PROCESS PREDICTION APPARATUS CONSIDERING OVERALL FEATURES AND LOCAL FEATURES

This application claims the benefit of People's Republic of China application Serial No. 202110118090.4, filed Jan. 28, 2021, the disclosure of which is incorporated by reference herein in its entirety.

TECHNICAL FIELD

The disclosure relates in general to a semiconductor process prediction method and a semiconductor process prediction apparatus, and more particularly to a semiconductor process prediction method and a semiconductor process prediction apparatus considering overall features and local features.

BACKGROUND

With the development of semiconductor technology, various types of complex semiconductor products are constantly being introduced. In the semiconductor manufacturing process, the wafer needs to go through tens thousands of processes to produce the final product. Therefore, researchers must use appropriate prediction methods for the semiconductor process to predict the occurrence of process abnormalities to avoid a large number of defective products in the final products.

Traditionally, statistical data such as average or standard deviation is monitored to estimate the abnormalities that may occur in the process. However, this method only considers the overall features, and under the trend of increasing complexity of the semiconductor process, it has been difficult to obtain prediction results with higher accuracy.

SUMMARY

The disclosure is directed to a semiconductor process prediction method and a semiconductor process prediction apparatus considering overall features and local features. The local features and the overall features are analyzed by using a dynamic time warping (DTW), a Convolutional Neural Network (CNN) model and an Artificial Neural Network (ANN) model to improve the prediction accuracy.

According to one embodiment, a semiconductor process prediction method considering overall features and local features is provided. The semiconductor process prediction method includes the following steps. A plurality of equipment sensing curves are obtained. The equipment sensing curves are filtered to reduce a co-linearity of the equipment sensing curves. A dynamic time warping (DTW) is performed to align the equipment sensing curves. The equipment sensing curves which are aligned are inputted into a Convolutional Neural Network (CNN) model, to obtain a first prediction result considering the local features. A statistical analysis procedure is performed on the equipment sensing curves to obtain a plurality of statistical data. The statistical data are inputted into an Artificial Neural Network (ANN) model, to obtain a second prediction result considering the overall features. A total prediction result is obtained according to the first prediction result and the second prediction result.

According to another embodiment, a semiconductor process prediction apparatus considering overall features and local features is provided. The semiconductor process prediction apparatus includes a database, a filtering unit, a filtering unit, an aligning unit, a Convolutional Neural Network (CNN) model, a statistical unit, an Artificial Neural Network (ANN) model and a total prediction unit. The database is configured to storing a plurality of equipment sensing curves. The filtering unit is configured to filter the equipment sensing curves to reduce a co-linearity of the equipment sensing curves. The aligning unit is configured to perform a dynamic time warping (DTW) to align the equipment sensing curves. The CNN model is configured to receive the equipment sensing curves which are aligned to obtain a first prediction result considering the local features. The statistical unit is configured to perform a statistical analysis procedure on the equipment sensing curves to obtain a plurality of statistical data. The ANN model is configured to receive the statistical data to obtain a second prediction result considering the overall features. The total prediction unit is configured to obtain a total prediction result according to the first prediction result and the second prediction result.

BRIEF DESCRIPTION OF THE DRAWINGS

FIG. 3 illustrates a flow chart of a semiconductor process prediction method simultaneously considering overall features and local features according to an embodiment.

Figure 1:
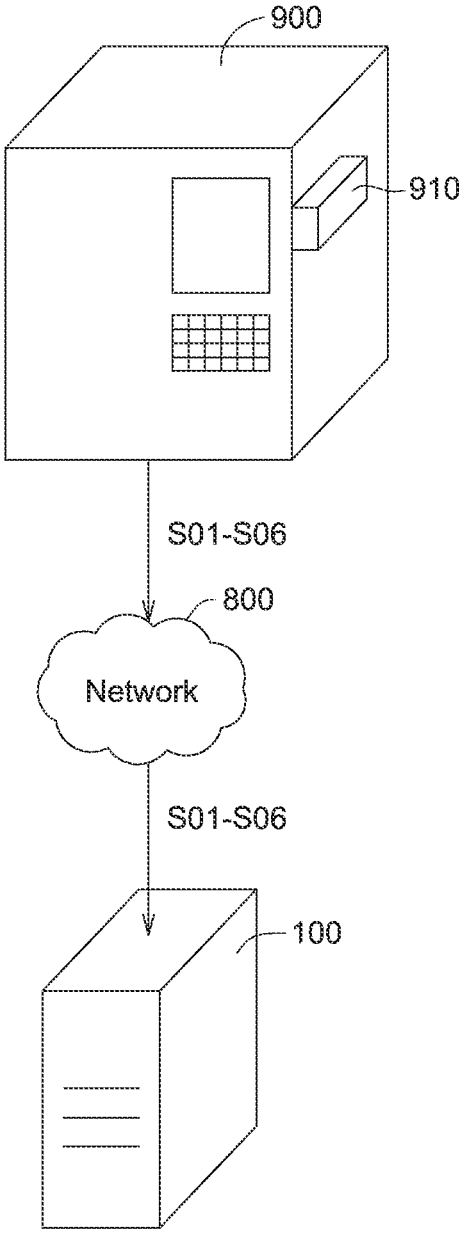
FIG. 1 shows a semiconductor process prediction apparatus according to an embodiment.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

Please refer to FIG. 1, which shows a semiconductor process prediction apparatus 100 according to an embodiment. In the semiconductor process, the wafer needs to go through various pieces of equipment 900 for different processes, such as deposition, etching, or annealing. Every process of every equipment 900 requires precise monitoring. Therefore, various sensors 910 are set on the equipment 900 to capture sensing data S01 to S06 such as temperature, pressure, gas concentration (the number is not to limit the present invention). These sensing data S01 are continuously captured over time and transmitted to the semiconductor process prediction apparatus 100 through network 800 to record as an equipment sensing curve S11 (shown in FIG. 2); these sensing data S02 are continuously captured over time and recorded as an equipment sensing curve S12 (shown in FIG. 2), and so on. The semiconductor process prediction apparatus 100 can perform Fault Detection and Classification (FDC) with these equipment sensing curves S11 to S16

(the number is not used to limit the present invention). When abnormal conditions of the process are predicted, the process can be stopped or modified immediately to avoid process defects.

Figure 2:
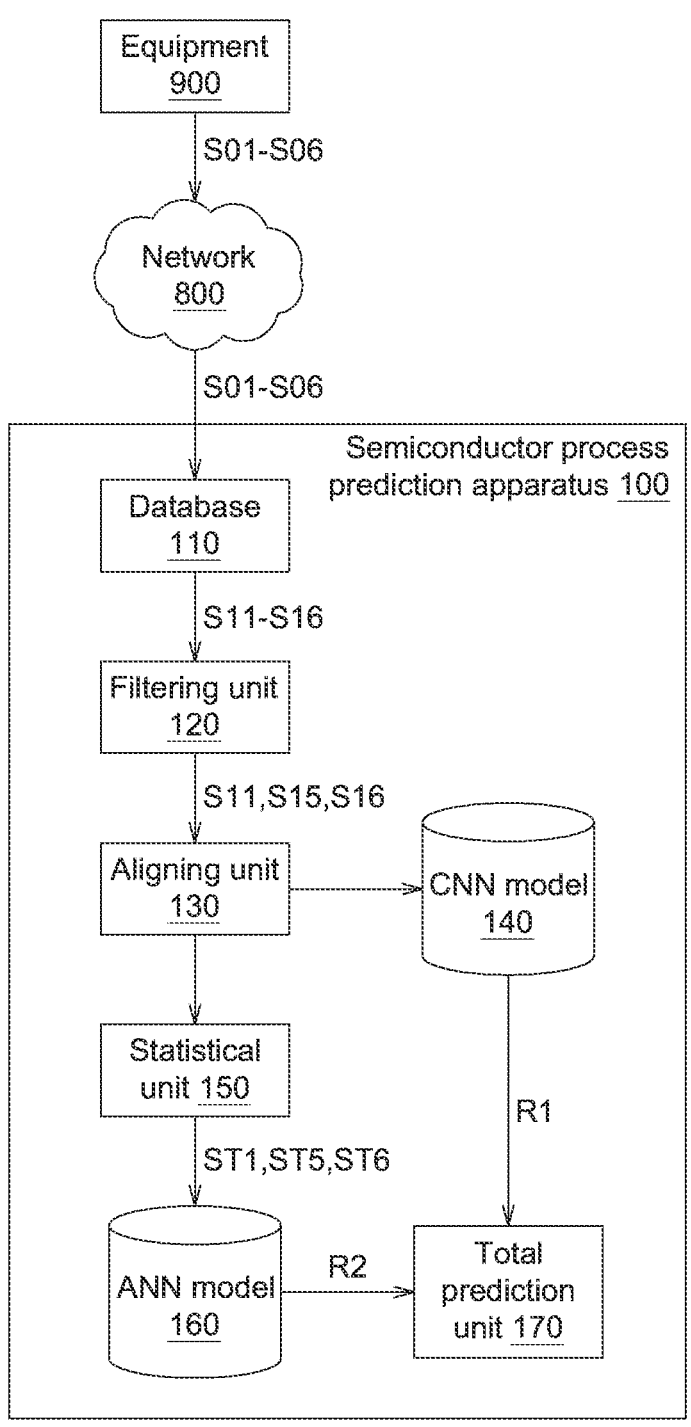
FIG. 2 shows a block diagram of the semiconductor process prediction apparatus according to an embodiment.

Please refer to FIG. 2, which shows a block diagram of the semiconductor process prediction apparatus 100 according to an embodiment. The semiconductor process prediction apparatus 100 is, for example, a server, a computer or a cloud computing center. The semiconductor process prediction apparatus 100 includes a database 110, a filtering unit 120, an aligning unit 130, a Convolutional Neural Network (CNN) model 140, a statistical unit 150, an Artificial Neural Network (ANN) model 160 and a total prediction unit 170. The functions of the components are summarized as follows. The database 110 is used to store data, such as a memory, a hard disk or a cloud storage center. The filtering unit 120 is used for data filtering. The aligning unit 130 is used for data alignment. The CNN model 140, the ANN model 160 and the total prediction unit 170 are used for data prediction. The statistical unit 150 is used for data statistics. The filtering unit 120, the aligning unit 130, the CNN model 140, the statistical unit 150, the ANN model 160 and/or the total prediction unit 170 are, for example, program codes, a circuit, a chip, a circuit board, or a storage device that stores program codes. In this embodiment, the semiconductor process prediction apparatus 100 can perform time alignment of the curve through the aligning unit 130, and directly analyze the curve through the CNN model 140 to consider the local features. In addition, the semiconductor process prediction apparatus 100 uses the statistical unit 150 to perform statistics on the curve, and analyzes the statistical data through the ANN model 160 to consider the overall features. In other words, the semiconductor process prediction apparatus 100 can consider the local features and the overall features at the same time to improve prediction accuracy. The detail of the operation of the semiconductor process prediction apparatus 100 is described through a flowchart as follows.

Figure 4:
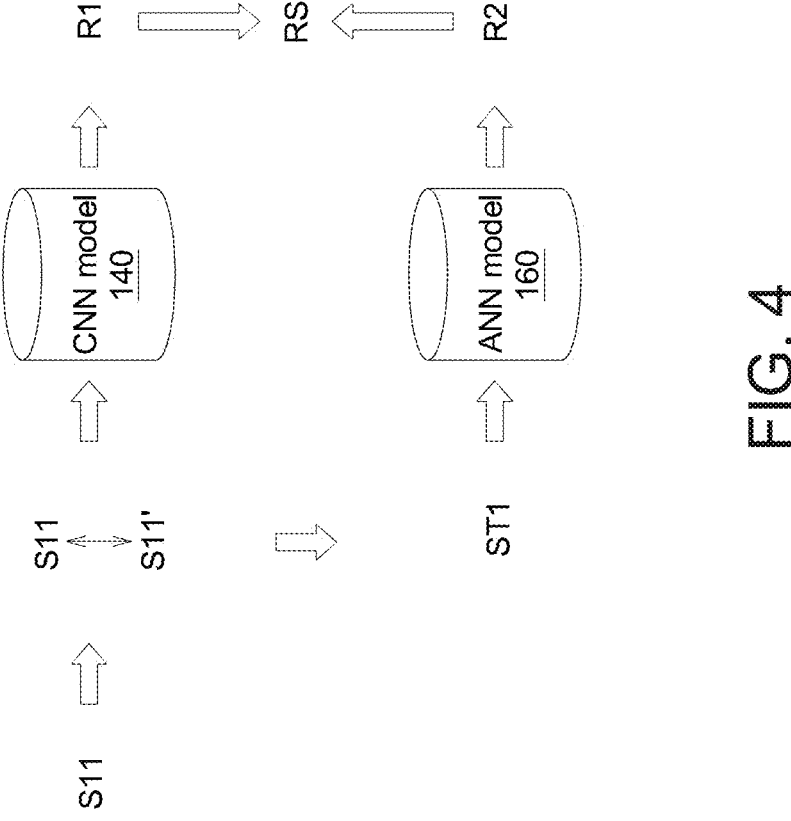
FIG. 4 illustrates the steps in FIG. 3.

Please refer to FIGS. 3 and 4. FIG. 3 illustrates a flow chart of a semiconductor process prediction method simultaneously considering the overall features and the local features according to an embodiment. FIG. 4 illustrates the steps in FIG. 3. In step S110, the equipment sensing curves S11 to S16 are obtained from the database 110. Each of the equipment sensing curves S11 to S16 is respectively composed of the sensing data S01 to S06 captured continuously over time.

Next, in step S120, the filtering unit 120 filters the equipment sensing curves S11 to S16 to reduce the co-linearity of the equipment sensing curves S11 to S16. For example, an increase in temperature will cause pressure to rise; a drop in temperature will also cause pressure to drop. Therefore, there is co-linearity between the temperature factor and the pressure factor, and they are essentially the same factor. If the temperature sensing curve and the pressure sensing curve are included in the subsequent analysis, the learning and prediction of the CNN model 140 will be overly focused on the same factor, which will reduce the accuracy. If the temperature sensing curve and the pressure sensing curve are included in the subsequent analysis, the learning and prediction of the CNN model 140 will be overly focused on the same factor, which will reduce the accuracy. Therefore, reducing the co-linearity of equipment sensing curve S1 through appropriate filtering steps can ensure the accuracy of prediction.

Figure 5:
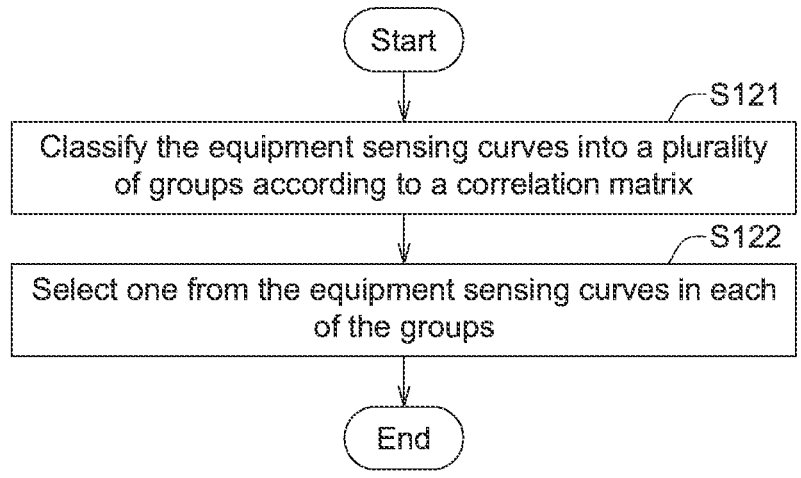
FIG. 5 shows a flowchart of the detailed steps of step S120.
Figure 6:
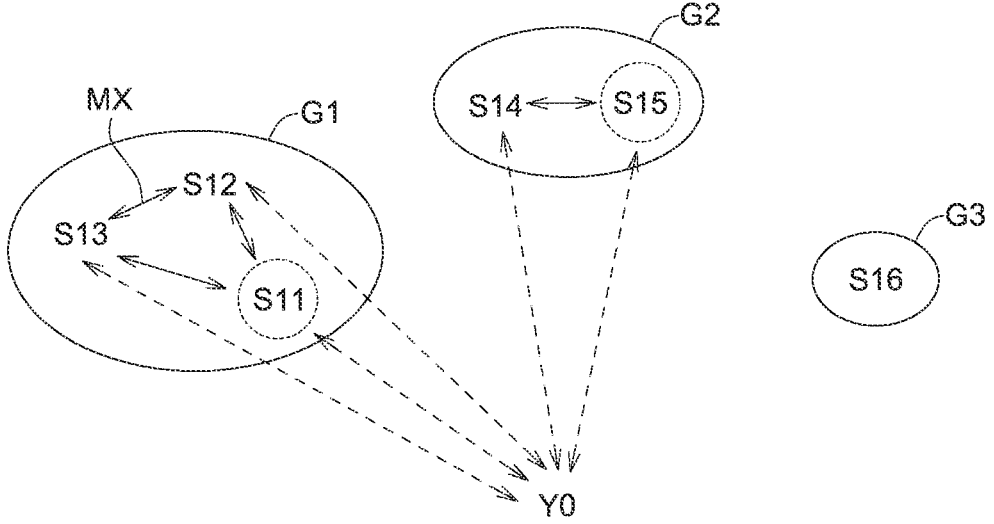
FIG. 6 illustrates the steps in FIG. 5.

Refer to FIGS. 5 and 6. FIG. 5 shows a flowchart of the detailed steps of step S120. FIG. 6 illustrates the steps of FIG. 5. The step S120 includes steps S121 and S122. In the example shown in FIG. 6, there are 6 equipment sensing curves S11 to S16. In the step S121, the filtering unit 120 classifies the equipment sensing curves S11 to S16 into several groups G1 to G3 according to a correlation matrix MX. The correlation matrix MX records the correlation coefficients (as shown by the solid double arrow in FIG. 6) between any two of the equipment sensing curves S11 to S16. Those whose relationship coefficient is greater than a predetermined threshold are classified into the same group. As shown in FIG. 6, the equipment sensing curves S11 to S13 are classified into the group G1; the equipment sensing curves S14 to S15 are classified into the group G2; the equipment sensing curve S16 is classified into the group G3.

Next, in the step S122, the filtering unit 120 selects one from the equipment sensing curves in each of the groups G1, G2, G3. For example the equipment sensing curves S11, S15, S16 are respectively selected from the groups G1, G2, G3. Only one equipment sensing curve is selected for each of the groups G1, G2, G3. In the group G1, the equipment sensing curve S11 having the largest correlation coefficient (as shown by the dashed double arrow in FIG. 6) to the prediction target Y0 is selected. In the group G2, the equipment sensing curve S15 having the largest correlation coefficient (as shown by the dashed double arrow in FIG. 6) to the prediction target Y0 is selected. As a result, the selected equipment sensing curves S11, S15, and S16 have a low correlation and no co-linearity. In addition, the selected equipment sensing curves S11, S15, and S16 have higher correlation coefficients to the prediction target Y0, and are the most representative.

Next, in step S130 of FIG. 3, the aligning unit 130 performs a dynamic time warping (DTW) to align the equipment sensing curves S11, S15, S16. As shown in FIG. 4, the equipment sensing curve S11 will be compared with a template curve S11', and the equipment sensing curve S11 can be effectively mapped to the template curve S11' through alignment points. Similarly, the dynamic time warping (DTW) will also be performed for other equipment sensing curves S15, S16.

Then, in step S140, the equipment sensing curves S11, S15, S16 which are aligned are inputted into the CNN model 140 to obtain a first prediction result R1 that considers the local features. The CNN model 140 is, for example, a LeNet model, an AlexNet model, a VGG model, a GoogLeNet model or a ResNet model.

The data inputted into the CNN model 140 in this step is a continuous curve, which can take into account the detailed features of the continuous curve, including bursts, drift, oscillations, etc.

Figure 7:
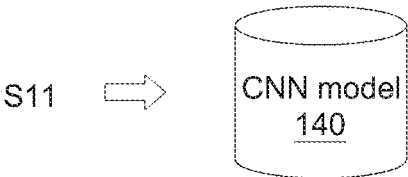
FIG. 7 shows an implementation of a Convolutional Neural Network (CNN) model.

Please refer to FIG. 7, which shows an implementation of the CNN model 140. The CNN model 140 is, for example, a single-channel model. The single-channel model analyzes only one factor at a time, which can avoid the interference of other factors.

Figure 8:
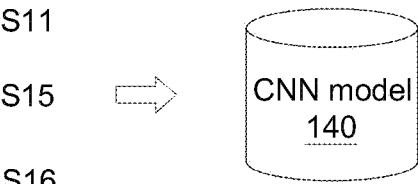
FIG. 8 shows another implementation of the CNN model.

Please refer to FIG. 8, which shows another implementation of the CNN model 140. The CNN model 140 is, for example, a multi-channel model. The multi-channel model can analyze multiple factors at the same time and consider the interaction of all factors at the same time.

Then, in step S150 of FIG. 2, the statistical unit 150 performs a statistical analysis procedure on the equipment sensing curves S11, S15, and S16 to obtain several statistical data ST1, ST5, ST6. Each of the statistical data ST1, ST5, ST6 is, for example, mean, standard deviation, median, etc.

Next, in step S160, the statistical data ST1, ST5, ST6 are inputted into the ANN model 160 to obtain a second prediction result R2 considering the overall features. The ANN model 160 is, for example, a Supervised Learning Network, a Unsupervised Learning Network, a Hybrid Learning Network, an Associate Learning Network, an Optimization Application Network, etc. The data inputted into the ANN model in this step are statistical values which are average, standard deviation, median, etc., which can take into account the overall features of the continuous curve, including overall deviation, overall stability, etc.

Then, in step S170, the total prediction unit 170 obtains a total prediction result RS according to the first prediction result R1 and the second prediction result R2. In this step, the total prediction unit 170 can obtain the total prediction result RS through a voting procedure.

According to the above embodiment, the semiconductor process prediction apparatus 100 and the semiconductor process prediction method can perform the time alignment of the curve, and directly analyze the curve through the CNN model 140 to consider the local features. In addition, the semiconductor process prediction apparatus 100 and the semiconductor process prediction method also perform the data statistics of the curve, and analyze the statistical data through the ANN model 160 to consider the overall features. In other words, the semiconductor process prediction apparatus 100 can consider the local features and the overall features at the same time to improve prediction accuracy.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A semiconductor process prediction method considering overall features and local features, comprising:
   obtaining a plurality of equipment sensing curves;
   filtering the equipment sensing curves to reduce a colinearity of the equipment sensing curves, wherein the step of filtering the equipment sensing curves comprises:
     classifying the equipment sensing curves into a plurality of groups according to a correlation matrix; and
     selecting one from the equipment sensing curves in each of the groups;
   performing, by an aligning circuit, a dynamic time warping (DTW) to align the equipment sensing curves with a template curve, wherein the equipment sensing curves and the template curve are continuous curves;
   inputting the equipment sensing curves which are aligned into a Convolutional Neural Network (CNN) model, to obtain a first prediction result considering the local features;
   performing a statistical analysis procedure on the equipment sensing curves to obtain a plurality of statistical data;
   inputting the statistical data into an Artificial Neural Network (ANN) model, to obtain a second prediction result considering the overall features; and
   obtaining a total prediction result according to the first prediction result and the second prediction result;
   wherein the first prediction result considering the local features and the second prediction result considering the overall features are obtained based on identical production lot;
   wherein the equipment sensing curves are used to obtain a plurality of continuous curve features including bursts, drift and oscillations and the statistical data including mean, standard deviation and median, and the continuous curve features and the statistical data of the equipment sensing curves are inputted into the CNN model and the ANN model respectively;
   wherein the CNN model and the ANN model are implemented by at least one circuit or chip to process the equipment sensing curves and the statistical data, respectively.

2. The semiconductor process prediction method considering the overall features and the local features according to claim 1, wherein each of the equipment sensing curves is composed of sensing data continuously captured over time.

3. The semiconductor process prediction method considering the overall features and the local features according to claim 1, wherein the CNN model is a single-channel model.

4. The semiconductor process prediction method considering the overall features and the local features according to claim 1, wherein the CNN model is a multi-channel model.

5. The semiconductor process prediction method considering the overall features and the local features according to claim 1, wherein in the step of obtaining the total prediction result according to the first prediction result and the second prediction result, the total prediction result is obtained through a voting procedure.

6. The semiconductor process prediction method considering the overall features and the local features according to claim 1, wherein the CNN model is a LeNet model, an AlexNet model, a VGG model, a GoogLeNet model or a ResNet model.

7. The semiconductor process prediction method considering the overall features and the local features according to claim 1, wherein each of the statistical data is mean, standard deviation or median.

8. The semiconductor process prediction method considering the overall features and the local features according to claim 1, wherein the ANN model is a Supervised Learning Network, an Unsupervised Learning Network, a Hybrid Learning Network, an Associate Learning Network or an Optimization Application Network.

9. A semiconductor process prediction apparatus considering overall features and local features, comprising:
   a database, configured to store a plurality of equipment sensing curves;
   a filtering unit, configured to filter the equipment sensing curves to reduce a colinearity of the equipment sensing curves, wherein the filtering unit classifies the equipment sensing curves into a plurality of groups according to a correlation matrix, and selects one from the equipment sensing curves in each of the groups;
   an aligning circuit, configured to perform a dynamic time warping (DTW) to align the equipment sensing curves with a template curve, wherein the equipment sensing curves and the template curve are continuous curves;
   a Convolutional Neural Network (CNN) model, configured to receive the equipment sensing curves which are aligned to obtain a first prediction result considering the local features;
   a statistical unit, configured to perform a statistical analysis procedure on the equipment sensing curves to obtain a plurality of statistical data;
   an Artificial Neural Network (ANN) model, configured to receive the statistical data to obtain a second prediction result considering the overall features; and
   a total prediction unit, configured to obtain a total prediction result according to the first prediction result and the second prediction result;

wherein the first prediction result considering the local features and the second prediction result considering the overall features are obtained based on identical production lot;

wherein the equipment sensing curves are used to obtain a plurality of continuous curve features including bursts, drift and oscillations and the statistical data including mean, standard deviation and median, and the continuous curve features and the statistical data of the equipment sensing curves are inputted into the CNN model and the ANN model respectively;

wherein the CNN model and the ANN model are implemented by at least one circuit or chip to process the equipment sensing curves and the statistical data, respectively.

10. The semiconductor process prediction apparatus considering the overall features and the local features according to claim 9, wherein each of the equipment sensing curves is composed of sensing data continuously captured over time.

11. The semiconductor process prediction apparatus considering the overall features and the local features according to claim 9, wherein the CNN model is a single-channel model.

12. The semiconductor process prediction apparatus considering the overall features and the local features according to claim 9, wherein the CNN model is a multi-channel model.

13. The semiconductor process prediction apparatus considering the overall features and the local features according to claim 9, wherein the total prediction unit obtains the total prediction result through a voting procedure.

14. The semiconductor process prediction apparatus considering the overall features and the local features according to claim 9, wherein the CNN model is a LeNet model, an AlexNet model, a VGG model, a GoogleNet model or a ResNet model.

15. The semiconductor process prediction apparatus considering the overall features and the local features according to claim 9, wherein each of the statistical data is mean, standard deviation or median.

16. The semiconductor process prediction apparatus considering the overall features and the local features according to claim 9, wherein the ANN model is a Supervised Learning Network, an Unsupervised Learning Network, a Hybrid Learning Network, an Associate Learning Network or an Optimization Application Network.

* * * * *